United States Patent Office.

JOHN PLAYER, OF NEW YORK, N. Y.

Letters Patent No. 79,681, dated July 7, 1868.

---

IMPROVEMENT IN THE MANUFACTURE OF IRON FROM TITANIFEROUS IRON ORES.

---

The Schedule referred to in these Letters Patent and making part of the same.

---

TO ALL WHOM IT MAY CONCERN:

Be it known that I, JOHN PLAYER, of the city, county, and State of New York, have invented certain new and useful Improvements in the Treatment of Titaniferous Iron Ores, so as the better to obtain iron therefrom in cupolas or blast-furnaces, of which the following is a full, clear, and exact description.

Heretofore the use of titaniferous iron ores or ilmenite in blast-furnaces has been attended with difficulty, and never, prior to my said invention, been successfully accomplished, owing to their tendency to clog up the furnace; consequently their use has never been considered as being of value in the blast-furnace.

The present invention provides a means for successfully treating such ores in blast-furnaces.

In the treatment of titaniferous iron ores, I, by preference, calcine them. The furnace may be of the ordinary construction, such as is used in the smelting of iron ores, and when heated is to be charged with the ores and following materials: About fifteen hundredweight of lime or limestone, about two tons and a half of titanic iron ore, if a true ilmenite, or a less quantity of ore if it has more iron and less titanic acid than the ilmenite, and about ten hundredweight of blast-furnace slag or basalt rock.

The cast iron thus obtained becomes titanized.

I do not confine myself to these proportions, but claim to alter them, inasmuch as titaniferous iron ores containing a greater or less percentage of titanic acid will require a greater or less percentage of the flux, and the other materials or fluxes will also require to be varied according to their quality. I do not confine myself to any particular fuel; all may be used that will smelt iron in blast-furnaces or cupolas. The quantity will vary as to its quality and the quality of the ores used.

Having thus described the nature of my said invention, and the manner of performing the same, I claim as my invention, and desire to secure by Letters Patent—

The smelting of titaniferous iron ores with blast-furnace slag, or scoria, or basalt rock, as a flux, or other equivalent, in the manner and substantially as herein described.

JOHN PLAYER.

Witnesses:
  WM. J. DELLEKER,
  HENRY POLSZ.